(12) United States Patent
Shi et al.

(10) Patent No.: US 9,886,619 B2
(45) Date of Patent: Feb. 6, 2018

(54) FINGERPRINT TEMPLATE BASED ON FUZZY FEATURE POINT INFORMATION AND FINGERPRINT IDENTIFICATION METHOD

(71) Applicant: Feng Shi, Beijing (CN)

(72) Inventors: Feng Shi, Beijing (CN); Zhongqiu Liu, Zhejiang (CN); Jian Li, Zhejiang (CN)

(73) Assignee: Feng Shi, Beijing (CN)

( * ) Notice: Subject to any disclaimer, the term of this patent is extended or adjusted under 35 U.S.C. 154(b) by 0 days.

(21) Appl. No.: 14/902,288

(22) PCT Filed: Dec. 24, 2014

(86) PCT No.: PCT/CN2014/094781
§ 371 (c)(1),
(2) Date: Dec. 30, 2015

(87) PCT Pub. No.: WO2015/101197
PCT Pub. Date: Jul. 9, 2015

(65) Prior Publication Data
US 2016/0371532 A1   Dec. 22, 2016

(30) Foreign Application Priority Data

Dec. 31, 2013 (CN) .......................... 2013 1 0754835

(51) Int. Cl.
G06K 9/00 (2006.01)
(52) U.S. Cl.
CPC ..... *G06K 9/00087* (2013.01); *G06K 9/00067* (2013.01); *G06K 9/00093* (2013.01)
(58) Field of Classification Search
CPC ........... G06K 9/00087; G06K 9/00067; G06K 9/00093
See application file for complete search history.

(56) References Cited

U.S. PATENT DOCUMENTS

| 8,374,419 B2 * | 2/2013 | Muquit | G06K 9/00067 382/128 |
| 8,483,449 B2 * | 7/2013 | Muquit | G06K 9/00067 382/115 |

(Continued)

FOREIGN PATENT DOCUMENTS

| CN | 101013943 A | 8/2007 |
| CN | 101777115 A | 7/2010 |

OTHER PUBLICATIONS

Jeffers, Jason, and Arathi Arakala. "Fingerprint alignment for a minutiae-based fuzzy vault." Biometrics Symposium, 2007. IEEE, 2007.*

(Continued)

*Primary Examiner* — Jonathan S Lee
(74) *Attorney, Agent, or Firm* — Pearl Cohen Zedek Latzer Baratz LLP (57) ABSTRACT

The present invention discloses a fingerprint template and a fingerprint identification method based on fuzzy feature point information. The fingerprint template contains several pieces of incomplete feature point information, including registration information and comparison information, wherein only coordinate information and attribute information of feature points and a value of a polynomial are recorded. In the polynomial $P(X_i)=C_0+C_1X_i+C_2X_i^2 \ldots C_nX_i^n$, n is an order of the polynomial, and Xi is a numerical value obtained by quantifying one or multiple pieces of feature point information except the registration information in the feature point information and is a coefficient having a certain preset rule. Corresponding feature point information of a scene fingerprint is substituted into the polynomial to figure out $C_0$-$C_n$, and whether the $C_0$-$C_n$ meet the preset rule is judged to judge whether the scene fingerprint is matched with a template fingerprint.

8 Claims, 3 Drawing Sheets (56) References Cited

U.S. PATENT DOCUMENTS

| | | | |
|---|---|---|---|
| 2005/0129291 A1* | 6/2005 | Boshra | G06K 9/00026 382/124 |
| 2007/0286465 A1* | 12/2007 | Takahashi | G06F 21/32 382/125 |
| 2008/0013804 A1 | 1/2008 | Moon et al. | |
| 2010/0021014 A1* | 1/2010 | Bebis | G06K 9/00375 382/115 |
| 2010/0092048 A1* | 4/2010 | Pan | G06F 21/32 382/125 |
| 2010/0208947 A1* | 8/2010 | Muquit | G06K 9/00067 382/115 |
| 2010/0226558 A1* | 9/2010 | Muquit | G06K 9/00067 382/134 |
| 2011/0123072 A1* | 5/2011 | Moon | G06K 9/00093 382/125 |
| 2013/0077836 A1* | 3/2013 | Zhou | G06K 9/00067 382/125 |
| 2013/0101186 A1* | 4/2013 | Walch | G06K 9/00093 382/125 |
| 2016/0132715 A1* | 5/2016 | Feng | G06F 17/3028 382/125 |

OTHER PUBLICATIONS

Li, Jianjie, et al. "Topological structure-based alignment for fingerprint fuzzy vault." Pattern Recognition, 2008. ICPR 2008. 19th International Conference on. IEEE, 2008.*

International Search Report for PCT International Application No. PCT/CN2014/094781, dated Mar. 31, 2015.

* cited by examiner

| fingerprint template | | scene fingerprint |
|---|---|---|
| l1 | largest side length | l1' |
| l2 | second largest side length | l2' |
| l3 | smallest side length | l3' |
| θ1 | largest angle | θ1' |
| θ2 | second largest angle | θ2' |
| θ3 | smallest angle | θ3' |
| $X_{P1}$ | largest angle vertex horizontal coordinate | $X_{P1}'$ |
| $Y_{P1}$ | largest angle vertex vertical coordinate | $Y_{P1}'$ |
| $\overline{P1P2}$ | vector from the largest angle vertex to the second largest angle | $\overline{P1'P2'}$ |
| $\overline{P1P3}$ | vector from the largest angle vertex to the smallest angle vertex | $\overline{P1'P3'}$ |
| P1 attribute | attribute of the largest angle vertex | P1 attribute |
| P2 attribute | attribute of the second largest angle vertex | P2 attribute |
| P3 attribute | attribute of the smallest angle vertex | P3 attribute |

FINGERPRINT TEMPLATE BASED ON FUZZY FEATURE POINT INFORMATION AND FINGERPRINT IDENTIFICATION METHOD

CROSS-REFERENCE TO RELATED APPLICATIONS

This application is a National Phase Application of PCT International Application No. PCT/CN2014/094781, International Filing Date Dec. 24, 2014, and claiming priority of Chinese Patent Application No. 201310754835.1, filed Dec. 31, 2013, which are hereby incorporated by reference in their entireties.

TECHNICAL FIELD

The present invention relates to the field of fingerprint identification, and in particular, relates to a fingerprint template and a fingerprint recognition method based on fuzzy feature point information.

BACKGROUND

Fingerprint identification refers to an identification mode of comparing a scene fingerprint of a person with other pre-stored fingerprint templates to verify the true identity of the person.

The so-called fingerprint template records complete information of fingerprint feature points, including coordinates, attributes, angles, even crest line widths and other information of the feature points. The establishment process of a typical fingerprint template is as follows: collecting a human fingerprint image through a fingerprint reading device, and processing the collected original image to make the same be clearer; then extracting the fingerprint feature points (the feature points are generally endpoints, crunodes, central points and the like of fingerprints), obtaining data description (coordinates, attributes, angles and the like, namely, the feature point information) of the geometric meaning of the feature points, and finally storing the formed fingerprint template. After being collected, the scene fingerprint image will be processed to extract the feature points to obtain the feature point information. Furthermore, the feature point information of the scene fingerprint and the feature point information of the fingerprint template are compared to complete a fingerprint identification process. Accordingly, the fingerprint template is a core data structure of a fingerprint identification method.

Figure 1:
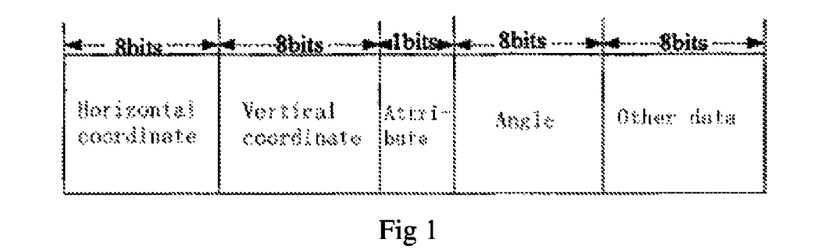
FIG. 1 shows a schematic diagram of a structure of a piece of existing fingerprint feature point information.

Currently, the establishment of various fingerprint identification methods is based on fingerprint templates with complete feature point information, that is, the fingerprint template records the complete feature value information of the feature points, including coordinates, attributes (i.e., the above-mentioned endpoints, the crunodes, the central point and the like), angles, even crest line widths and other data of the feature points. The schematic diagram of a structure of a piece of typical existing fingerprint feature point information is as shown in FIG. 1, the lengths of various data therein can be set according to actual conditions, for example, the data length of an angle is 8 bits in FIG. 1 and can be set to 9 bits or 7 bits in actual conditions, and here it is illustrative. Such existing fingerprint template has an insuperable defect: since the fingerprint template records the values of the complete feature point information of the feature points, once the fingerprint template is leaked, the fingerprint template may be used by malicious people to restore fingerprint images according to the information of the fingerprint template, or make fingerprint images containing the same feature points. This causes risks to the security and privacy of users. Various fingerprint identification methods applied currently have such problem.

Thus, a method is proposed for adding hash points in the fingerprint template to protect the information in the fingerprint template, however, this method has the defects that, first, the fingerprint template cannot be updated, since true points of the template generated by the method are invariable, and the hash points are randomly generated, an attacker can easily obtain the true points when obtaining two or more templates; and second, a large number of hash points (generally larger than 10 times of real fingerprint feature points) need to be added in the fingerprint template, resulting in an increased data volume, the difficulty of the algorithm in the comparison process will be correspondingly increased, and the fingerprint template still has complete feature point information, so that the defect that the feature point information is restored to the fingerprint cannot be overcome completely.

SUMMARY

In view of the above-mentioned shortcomings in the prior art, the present invention provides a fingerprint template based on fuzzy feature point information, and the present invention is achieved by the following technical solutions:

The fingerprint template based on the fuzzy feature point information includes: multiple pieces of fuzzy feature point information established based on a part of feature point information of a template fingerprint, and the multiple pieces of fuzzy feature point information are insufficient to restore the template fingerprint; and the fuzzy feature point information includes registration information and comparison information, the registration information includes a horizontal coordinate, a vertical coordinate and an attribute of the fuzzy feature point information, the comparison information includes the value of a polynomial $P(X_i)=C_0+C_1X_i+C_2X_i^2+\ldots+CnX_i^n$, n is an order of the polynomial, $X_i$ is a numerical value obtained by quantifying one or multiple pieces of feature point information except the registration information in the feature point information, and $C_0$-$C_n$ are coefficients having a preset rule.

Preferably, the preset rule includes: $C_0$-$C_n$ include a first portion and a second portion, the value of the first portion is randomly generated, and the value of the second portion is a value obtained by calculating the value of the first portion according to the preset rule.

By adopting the fingerprint template establishment method based on the fuzzy feature point information provided by the present invention, the fingerprint template is incomplete feature point information and only records the coordinate information and the attribute information of the feature points and the value of one polynomial. The information is insufficient to restore the fingerprint image and is insufficient to compare the fingerprints alone, thereby guaranteeing the privacy and security of users.

The present invention further provides a fingerprint identification method based on fuzzy feature point information, which is achieved by the following technical solutions:

The fingerprint identification method based on the fuzzy feature point information includes the following steps: S1, obtaining a fingerprint template based on the fuzzy feature point information and a scene fingerprint; S4, comparing the scene fingerprint with the fingerprint template based on the fuzzy feature point information;

the fingerprint template based on the fuzzy feature point information includes: multiple pieces of fuzzy feature point information established based on a part of feature point information of a template fingerprint, and the multiple pieces of fuzzy feature point information are insufficient to restore the template fingerprint; and the fuzzy feature point information includes registration information and comparison information, the registration information includes a horizontal coordinate, a vertical coordinate and an attribute of the fuzzy feature point information, the comparison information includes the value of a polynomial $P(X_i)=C_0+C_1X_i+C_2X_i^2+ \ldots +C_nX_i^n$, n is an order of the polynomial, Xi is a numerical value obtained by quantifying one or multiple pieces of feature point information except the registration information in the feature point information, and $C_0$-$C_n$ are coefficients having a preset rule; and the step S4 includes: substituting the corresponding feature point information of the scene fingerprint into the polynomial, calculating the values of $C_0$-$C_n$, judging whether the calculated $C_0$-$C_n$ meet the preset rule, if the judgment result is yes, the scene fingerprint is matched with the fingerprint template based on the fuzzy feature point information, and if the judgment result is no, the scene fingerprint is not matched with the fingerprint template based on the fuzzy feature point information.

Preferably, the method further includes the following step between the step S1 and the step S4:S2, carrying out fingerprint registration on the scene fingerprint and the fingerprint template based on the fuzzy feature point information; and the step S2 includes the following steps:

a, selecting three horizontal coordinates and vertical coordinates of the fuzzy feature point information of the fingerprint template based on the fuzzy feature point information to serve as vertexes, in order to establish a first non-isosceles triangle, and recording the geometric data of the first non-isosceles triangle;

b, selecting three horizontal coordinates and vertical coordinates of the feature point information of the scene fingerprint to serve as vertexes, in order to establish a second non-isosceles triangle, and recording the geometric data of the second non-isosceles triangle;

c, matching the first non-isosceles triangle with the second non-isosceles triangle;

d, repeating the step a to the step c, if matched non-isosceles triangles larger than a first threshold pair can be obtained, executing e; if the matched non-isosceles triangles larger than the first threshold pair cannot be obtained, the scene fingerprint is not matched with the fingerprint template based on the fuzzy feature point information; and e, calculating a rotation angle and a translation distance of the scene fingerprint relative to the fingerprint template based on the fuzzy feature point information, and rotating and/or translating the scene fingerprint according to a calculation result to register the scene fingerprint with the fingerprint template based on the fuzzy feature point information.

Preferably, the geometric data include: a largest side length, a second largest side length, a smallest side length, a largest angle, a second largest angle, a smallest angle, a largest angle vertex horizontal coordinate, a largest angle vertex vertical coordinate, a vector from the largest angle vertex to the second largest angle, a vector from the largest angle vertex to the smallest angle vertex, an attribute of the largest angle vertex, an attribute of the second largest angle vertex and an attribute of the smallest angle vertex.

Preferably, the step e of calculating the rotation angle and the translation distance of the scene fingerprint relative to the fingerprint template based on the fuzzy feature point information, and rotating and/or translating the scene fingerprint according to the calculation result, includes: with the largest angle vertex of the scene fingerprint as a fiducial point, respectively calculating the rotation angle and the translation distance of the non-isosceles triangle matched with the first threshold pair, and rotating and translating the scene fingerprint by using the calculated numerical values with the highest frequency as a rotation coefficient and a translation coefficient of the scene fingerprint.

Preferably, matching success in the step e includes the following conditions:

the attributes of three pairs of vertexes corresponding to the scene fingerprint and the fingerprint template based on the fuzzy feature point information are consistent;

the length differences of three pairs of sides corresponding to the scene fingerprint and the fingerprint template based on the fuzzy feature point information are within a second threshold; and the angle differences of three pairs of angles corresponding to the scene fingerprint and the fingerprint template based on the fuzzy feature point information are within a third threshold.

Preferably, the method further includes the following step between the step S2 and the step S4:

S3, calculating the number of the horizontal coordinate, the vertical coordinate and the attribute of the rotated and translated scene fingerprint matched with the feature points of the registration information of the fingerprint template based on the fuzzy feature point information, if the calculation result is not larger than a fourth threshold, the scene fingerprint is not matched with the fingerprint template based on the fuzzy feature point information, and if the calculation result is larger than a fourth threshold, executing the step S4.

Preferably, $C_0$-$C_n$ include a first portion and a second portion, the value of the first portion is randomly generated, and the value of the second portion is a value obtained by calculating the value of the first portion according to the preset rule.

Preferably, the step S4 of substituting the feature point information of the scene fingerprint into the polynomial, calculating the values of $C_0$-$C_n$ and judging whether the calculated $C_0$-$C_n$ meet the preset rule, includes:

substituting the feature point information of the scene fingerprint into the polynomial, calculating the values of $C_0$-$C_n$, obtaining the value of the first portion in $C_0$-$C_n$, calculating the value of the first portion according to the preset rule to obtain the value of the second portion, and judging whether the calculated value of the second portion is the same as the value of the second portion in the template fingerprint.

By adopting the fingerprint identification method based on the fuzzy feature point information provided by the present invention, the fingerprint template is incomplete feature point information and only records the coordinate information and the attribute information of the feature points and the value of one polynomial. The information is insufficient to restore the fingerprint image and is insufficient to compare the fingerprints alone, the feature point information of the scene fingerprint is substituted into the polynomial to figure out the coefficients, and whether the scene fingerprint is matched with the template fingerprint is judged by judging whether the coefficients meet the preset rule. Therefore, the privacy and security of users are guaranteed.

DETAILED DESCRIPTION OF THE PREFERRED EMBODIMENTS

The technical solutions in the embodiments of the present invention will be described and discussed clearly and completely below in combination with the accompanying drawings of the present invention. Apparently, the embodiments described herein are merely a part, but not all, of the embodiments of the present invention. All of other embodiments, obtained by those of ordinary skill in the art based on the embodiments of the present invention without any creative effort, fall into the protection scope of the present invention.

In order to conveniently understand the embodiments of the present invention, further explanation and illustration will be given below in combination with the accompanying drawings with specific embodiments as examples, and the steps in the embodiments do not constitute limitation to the embodiments of the present invention.

Figure 2:
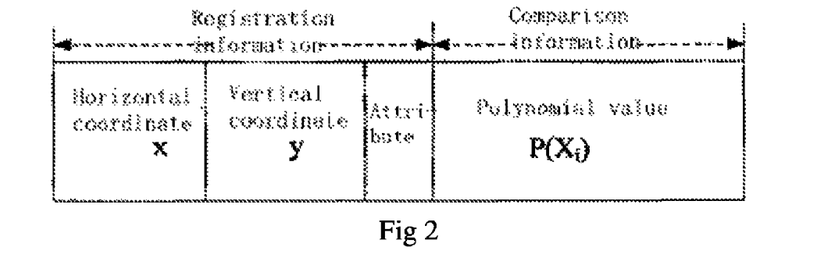
FIG. 2 shows a schematic diagram of a structure of fuzzy feature point information in the present invention.

The fingerprint template based on fuzzy feature point information provided by the present invention includes multiple pieces of fuzzy feature point information, the structure thereof is as shown in FIG. 2, and the fuzzy feature point information includes registration information and comparison information. The registration information is values of a part of feature information of feature points of the fingerprint, the information is insufficient to restore the fingerprint image and is insufficient to compare the fingerprints alone, but can be applied to registration. The comparison information is the values of the other feature point information except the feature point information of the registration information, can be the value of a piece of feature point information and can also be the values of multiple pieces of feature point information, is performed with fuzzy processing when forming the template, cannot be used for restoring the original feature and is used for comparison in the present invention.

The registration information includes horizontal coordinates x, vertical coordinates y and attributes of feature points. The attributes refer to the types of the feature points, namely, endpoints, crunodes, central points and the like. The comparison information includes the value of a polynomial $P(X_i)$. One or multiple feature values except the registration information are quantified into a numerical value $X_i$, and the polynomial $P(X_i)=C_0+C_1X_i+C_2X_i^2+ \ldots +C_nXi^n$ is constituted based on $X_i$. Coefficients $C_0$-$C_n$ have a preset rule. After figuring out the value of the polynomial, the value of $P(X_i)$ is substituted into the fingerprint template, and the coefficients $C_0$-$C_n$ do not enter the fingerprint template. n is an order of the polynomial. Preferably, n is generally 8 or an integer larger than 8, which means that the fingerprint template and a scene fingerprint have at least more than 9 quantitatively equal feature points, and this is not limited in the preset invention. $C_0$-$C_n$ contain n+1 coefficients in total, then in a subsequent matching process, at least n+1 matched points need to be found in the scene fingerprint and are substituted into the polynomial to figure out $C_0$-$C_n$. $X_i$ is a numerical value obtained by quantifying one or multiple pieces of feature point information except the registration information in the feature point information.

In a fingerprint comparison process, as long as the relevant fingerprint feature point information of the collected scene fingerprint is substituted into the polynomial, the values of $C_0$-$C_n$ can be obtained, whether the rule of the obtained $C_0$-$C_n$ is uniform with the rule of the $C_0$-$C_n$ when calculating the polynomial in the previous fingerprint template is judged, if so, the scene fingerprint is matched with the fingerprint template, and on the contrary, the scene fingerprint is not matched with the fingerprint template.

In order to facilitate the understanding of those skilled in the art, a specific embodiment is provided below:

step 1, establishment of a preferred fingerprint template based on fuzzy feature point information.

The template fingerprint is collected by a fingerprint reading device, the collected template fingerprint is processed, including image refinement, enhancement, de-noising and other means, and then a part of fingerprint feature points (endpoints, crunodes, central points and the like) is extracted to obtain the feature point information, including coordinate, attribute and angle information of the feature points, and multiple pieces of fuzzy feature point information are established to constitute the fingerprint template. Since a part of feature points is extracted to establish the multiple pieces of fuzzy feature point information, and the fuzzy feature point information is incomplete feature point information, thereby being insufficient to restore the template fingerprint.

Figure 3:
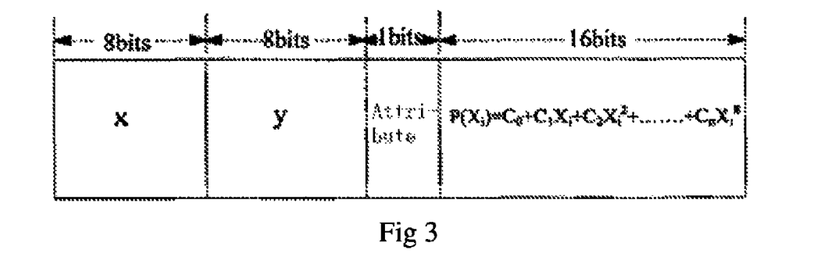
FIG. 3 shows a schematic diagram of a structure of a fingerprint template based on fuzzy feature point information and a data length thereof in one embodiment of the present invention.

Please refer to FIG. 3, the fingerprint template herein contains at least 27 pieces of fuzzy feature point information, the data structure of each piece of fuzzy feature point information includes 8 bits of horizontal coordinate x, 8 bits of vertical coordinate y, 1 bits of feature point attribute and 16 bits of value of a polynomial $P(X_i)=C_0+C_1X_i+C_2X_i^2+ \ldots +C_8X_i^8$. Wherein, $X_i$ is an angle feature value in the feature point information, 8 bits of angle feature value thereof is quantified to 6 bits of angle feature value, and n is equal to 8. The purpose of quantifying is to tolerate a certain measurement error.

$C_0$-$C_3$ are 16-bit random numbers, $C_0$-$C_3$ generate a 128-bit sequence by hash operation, former 80 bits of the sequence are extracted and are divided into 5 groups, there are 16 bits in each group, namely, $C_4$-$C_8$ can be obtained in sequence. The coefficients $C_0$-$C_8$ do not enter the fingerprint template, but the value of the polynomial is stored in the fingerprint template, and a certain rule has been established between $C_0$-$C_8$.

The fingerprint template established by the above steps only records the fuzzy feature point information, and due to the relationship randomly generated by $C_0$-$C_3$, even if the same fingerprint is collected for twice, the generated fingerprint templates are different. Therefore, the privacy and security of users can be protected more effectively.

Step 2, before the feature point information of the scene fingerprint is substituted into the polynomial for comparison, the embodiment further provides a registration process of the scene fingerprint and the fingerprint template.

Figure 4:
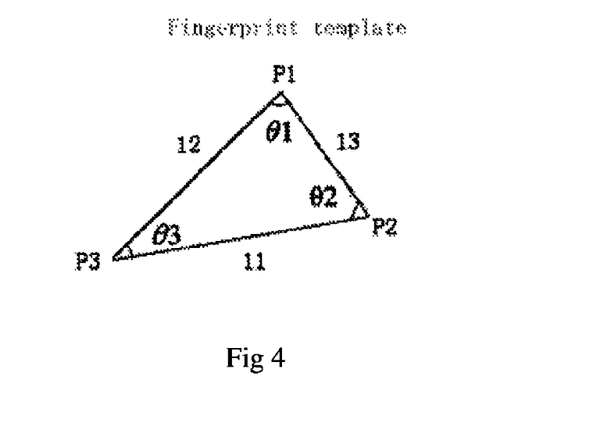
FIG. 4 shows a schematic diagram of a non-isosceles triangle established based on three pieces of feature point information in the fingerprint template based on the fuzzy feature point information in the present invention.
Figure 5:
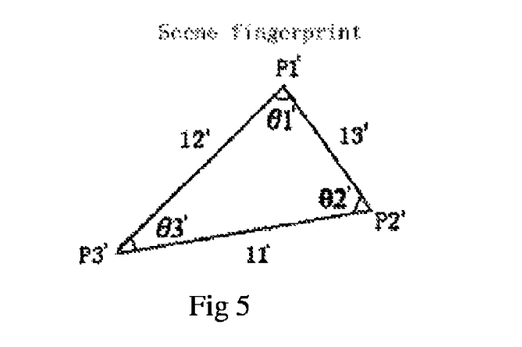
FIG. 5 shows a schematic diagram of a non-isosceles triangle established based on three pieces of feature point information of a scene fingerprint in the present invention.
Figure 6:
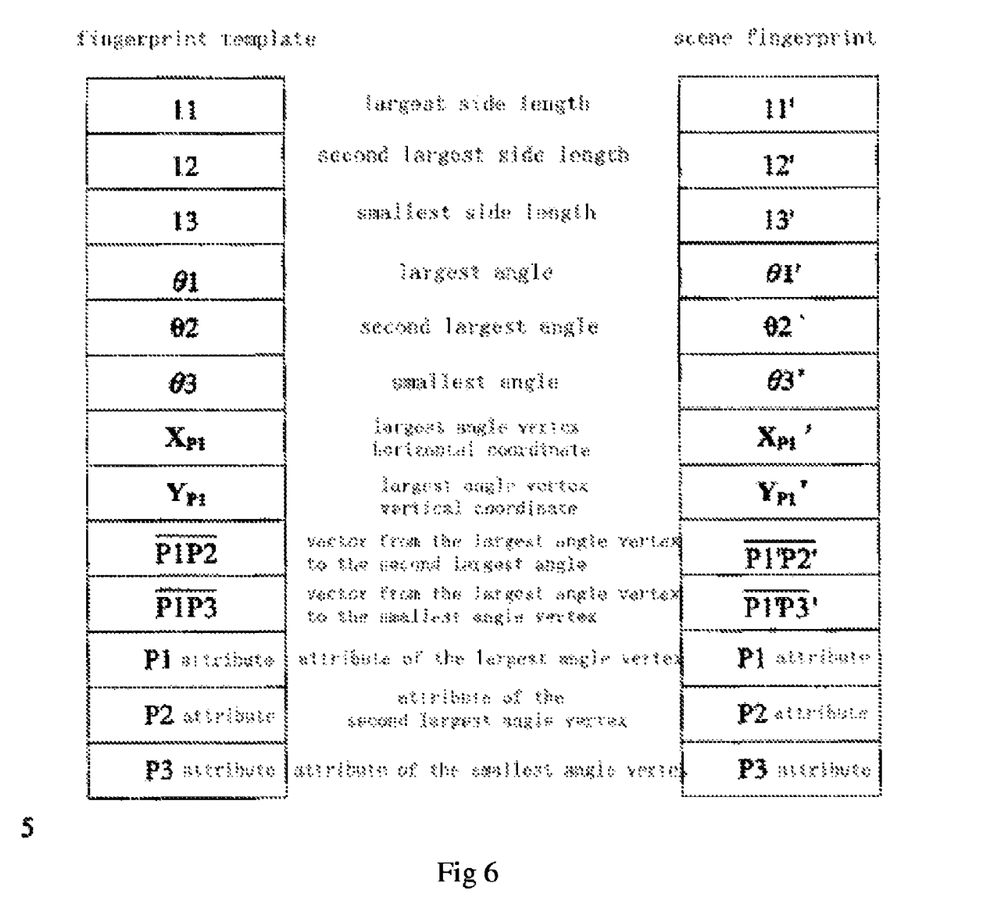
FIG. 6 shows a schematic diagram of geometric data of the non-isosceles triangle in the present invention.

According to the horizontal coordinates and the vertical coordinates in the three pieces of fuzzy feature point information in the above-mentioned fingerprint template, a first non-isosceles triangle as shown in FIG. 4 (i.e., other triangles excluding isosceles triangles and equilateral triangles) can be established, and a second non-isosceles triangle as shown in FIG. 5 can be established according to three pieces of feature point information of the scene fingerprint, and the geometric data of the two non-isosceles triangles are recorded respectively, as shown in FIG. 6.

The geometric data of the first non-isosceles triangle include: a largest side length 11, a second largest side length 12, a smallest side length 13, a largest angle 1, a second largest angle 2, a smallest angle 3, a largest angle vertex horizontal coordinate $X_{p1}$, a largest angle vertex vertical coordinate $Y_{p1}$, a vector from the largest angle vertex to the second largest angle, a vector from the largest angle vertex to the smallest angle vertex, an attribute of the largest angle vertex P1, an attribute of the second largest angle vertex P2 and an attribute of the smallest angle vertex P3.

The geometric data of the second non-isosceles triangle include: a largest side length 11', a second largest side length 12', a smallest side length 13', a largest angle 1', a second largest angle 2', a smallest angle 3', a largest angle vertex horizontal coordinate $X_{p1'}$, a largest angle vertex vertical coordinate $Y_{p1'}$, a vector from the largest angle vertex to the second largest angle, a vector from the largest angle vertex to the smallest angle vertex, an attribute of the largest angle vertex P1', an attribute of the second largest angle vertex P2' and an attribute of the smallest angle vertex P3'.

A triangle established by the fingerprint template is matched with a triangle established by the scene fingerprint. If the two triangles simultaneously meet the following conditions, it is deemed that the two triangles are matched:

1, the attributes of three vertexes are consistent 2, differences of three side lengths are within 3 (preferably a threshold, and this is not limited in the present invention)

3, differences of three angles are within 3 (preferably a threshold, and this is not limited in the present invention).

The process is repeated until obtaining 40 pairs of (preferably a threshold, and this is not limited in the present invention) matched triangles. If 40 pairs of matched triangles cannot be obtained, it is deemed that the two fingerprints are not matched.

On the condition of obtaining 40 pairs of matched triangles, with the largest angle vertex of the triangle established by the scene fingerprint as a fiducial point, a rotation angle and a translation distance of the triangle established by the scene fingerprint relative to the triangle established by the fingerprint template are calculated. The translation distance includes:

horizontal displacement=$Xp_1$-$Xp_{1'}$ vertical displacement=$Yp_1$-$Yp_{1'}$

The rotation angles and the translation distances of the 40 pairs of matched triangles are counted, numerical values with the highest occurrence frequency are respectively extracted to serve as a rotation coefficient and a translation coefficient of the scene fingerprint, and the scene fingerprint is rotated and translated.

Step 3, based on the step 2, the number of matched feature points of the scene fingerprint and the template fingerprint can be calculated again.

The feature point information of the scene fingerprint and the feature point information of the template fingerprint are compared. If the two feature points have the same coordinates and attributes, it is deemed that the two feature points are matched. The number of the matched points is counted:

if the number of the matched points is larger than 9 (preferably a threshold, and this is not limited in the present invention), entering step 4.

If the number of the matched points is not larger than 9 (preferably a threshold, and this is not limited in the present invention), it is deemed that the two fingerprints are not matched.

Step 4, the scene fingerprint is compared with the fingerprint template.

8 bits of angle feature value of the feature point information of the matched scene fingerprint are quantified into 6 bits of angle feature value, and the 6 bits of angle feature value are substituted into the polynomial and are equal to the value of the polynomial of the fingerprint template. Coefficients of the polynomial can be at least figured out by the following simultaneous equation set:

$$P(X_i)=C_0+C_0X_i+C_0X_i^2+\ldots+C_0X_i^8$$

$$P(X_i)=C_1+C_1X_i+C_1X_i^2+\ldots+C_1X_i^8$$

$$P(X_i)=C_2+C_2X_i+C_2X_i^2+\ldots+C_2X_i^8$$

$$P(X_i)=C_8+C_8X_i+C_8X_i^2+\ldots+C_8X_i^8$$

The quantified 6 bits of angle feature value are substituted into the polynomial to figure out $C_0$-$C_8$ which are calculated according to the feature information of the scene fingerprint.

To simplify the calculation, the actual operation of solving the equation set is carried out within a 2^16 Galois domain.

Figure 7:
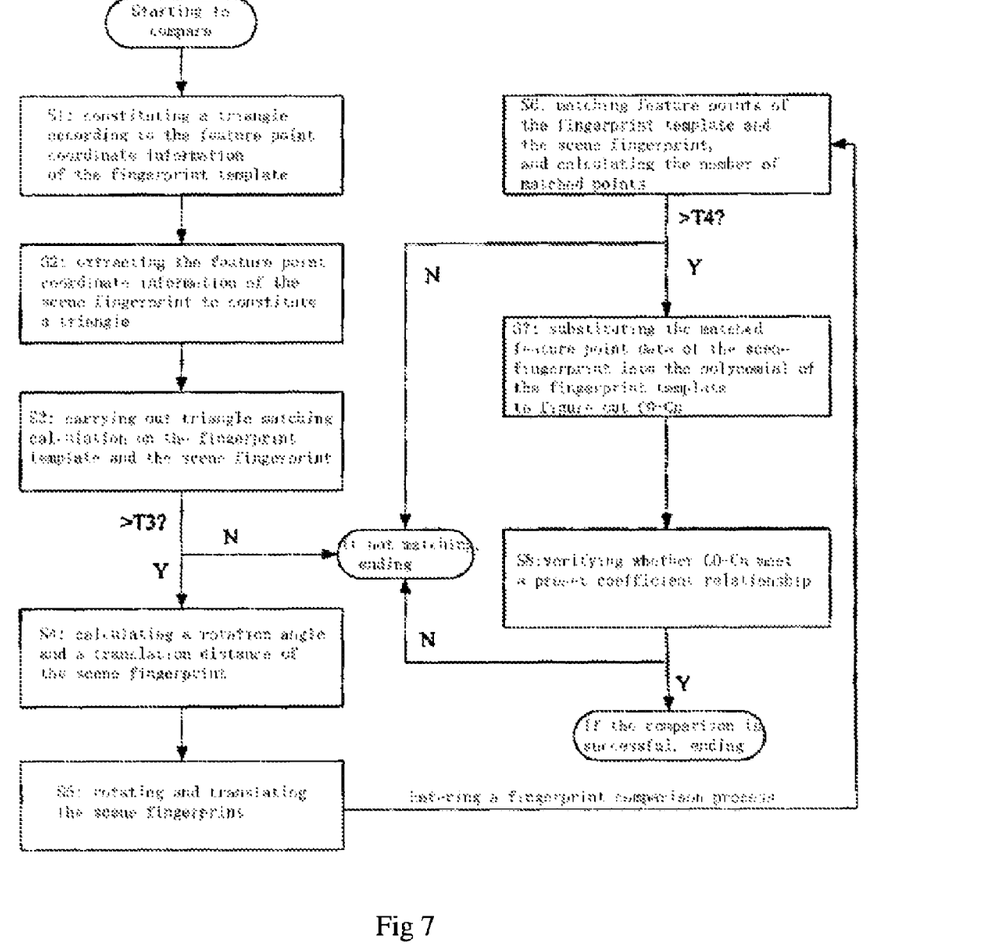
FIG. 7 shows a fingerprint identification method based on fuzzy feature point information in one embodiment of the present invention.

Finally, the hash operation is carried out on $C_0$-C3 which are calculated according to the feature information of the scene fingerprint to generate a 128-bit sequence, former 80 bits of the sequence are extracted and are divided into 5 groups, there are 16 bits in each group, and corresponding $C_4$-$C_8$ are obtained in sequence. Whether the $C_4$-$C_8$ obtained in this way is consistent with the $C_4$-$C_8$ obtained by the previous equation set is compared, if so, the scene fingerprint is matched with the template fingerprint, and the two fingerprints are successfully compared, if not, the two fingerprints are not matched. The flowcharts of the step 2 to the step 4 can refer to FIG. 7 at the same time.

The main principle of the present invention is to verify whether the obtained coefficient relationship is consistent with the preset relationship. The present invention has the beneficial effects that, the fingerprint template does not store complete feature point information and only records the coordinate information and the attribute information of the feature points and the value of one polynomial. The information is insufficient to restore the fingerprint image and is insufficient to compare the fingerprints alone, thereby guaranteeing the privacy and security of users. When carrying out polynomial mapping via a traditional fuzzy algorithm, the comparison information appears on the template, and the comparison information is fuzzed by adding more than 10 times of hash points. In the algorithm of the present invention, the comparison information does not appear on the template, and thus no hash point is added.

INDUSTRIAL APPLICABILITY

By adopting the fingerprint identification method based on the fuzzy feature point information provided by the present invention, the fingerprint template is incomplete feature point information and only records the coordinate information and the attribute information of the feature points and the value of one polynomial. The information is insufficient to restore the fingerprint image and is insufficient to compare the fingerprints alone, the feature point information of the scene fingerprint is substituted into the polynomial to figure out the coefficients, and whether the scene fingerprint is matched with the template fingerprint is judged by judging whether the coefficients meet the preset rule. Therefore, the privacy and security of users are guaranteed.

The forgoing descriptions are merely preferred embodiments of the present invention, rather than limiting the protection scope of the present invention. Any skilled one who is familiar with this art could readily think of variations or substitutions within the disclosed technical scope of the present invention, and these variations or substitutions shall fall within the protection scope of the present invention. Accordingly, the protection scope of the claims should prevail over the protection scope of the present invention.

The invention claimed is:

1. A fingerprint identification method based on fuzzy feature point information, comprising the following steps: S1, obtaining a fingerprint template based on the fuzzy feature point information and a scene fingerprint; S4, comparing the scene fingerprint with the fingerprint template based on the fuzzy feature point information;
the fingerprint template based on the fuzzy feature point information comprises: multiple pieces of fuzzy feature point information established based on a part of feature point information of a template fingerprint, and the multiple pieces of fuzzy feature point information are insufficient to restore the template fingerprint; and
the fuzzy feature point information comprises registration information and comparison information, registration information comprises a horizontal coordinate, a vertical coordinate and an attribute of the fuzzy feature point information, the comparison information includes the value of a polynomial $P(X_i)=C_0+C_1X_i+C_2X_i^2+\ldots+C_nX_i^n$, n is an order of the polynomial, $X_i$ is a numerical value obtained by quantifying one or multiple pieces of feature point information except the registration information in the feature point information, and $C_0$-$C_n$ are coefficients having a preset rule; and
the step S4 comprises: substituting the corresponding feature point information of the scene fingerprint into the polynomial, calculating the values of $C_0$-$C_n$, judging whether the calculated $C_0$-$C_n$ meet the preset rule, if the judgment result is yes, the scene fingerprint is matched with the fingerprint template based on the fuzzy feature point information, and if the judgment result is no, the scene fingerprint is not matched with the fingerprint template based on the fuzzy feature point information.

2. The fingerprint identification method based on the fuzzy feature point information of claim 1, further comprising the following step between the step S1 and the step S4: S2, carrying out fingerprint registration on the scene fingerprint and the fingerprint template based on the fuzzy feature point information; and
the step S2 comprises the following steps:
a, selecting three horizontal coordinates and vertical coordinates of the fuzzy feature point information of the fingerprint template based on the fuzzy feature point information to serve as vertexes, in order to establish a first non-isosceles triangle, and recording the geometric data of the first non-isosceles triangle;
b, selecting three horizontal coordinates and vertical coordinates of the feature point information of the scene fingerprint to serve as vertexes, in order to establish a second non-isosceles triangle, and recording the geometric data of the second non-isosceles triangle;
c, matching the first non-isosceles triangle with the second non-isosceles triangle;
d, repeating the step a to the step c, if matched non-isosceles triangles larger than a first threshold pair can be obtained, executing e; if the matched non-isosceles triangles larger than the first threshold pair cannot be obtained, the scene fingerprint is not matched with the fingerprint template based on the fuzzy feature point information; and
e, calculating a rotation angle and a translation distance of the scene fingerprint relative to the fingerprint template based on the fuzzy feature point information, and rotating and/or translating the scene fingerprint according to a calculation result to register the scene fingerprint with the fingerprint template based on the fuzzy feature point information.

3. The fingerprint identification method based on the fuzzy feature point information of claim 2, wherein the geometric data comprise: a largest side length, a second largest side length, a smallest side length, a largest angle, a second largest angle, a smallest angle, a largest angle vertex horizontal coordinate, a largest angle vertex vertical coordinate, a vector from the largest angle vertex to the second largest angle, a vector from the largest angle vertex to the smallest angle vertex, an attribute of the largest angle vertex, an attribute of the second largest angle vertex and an attribute of the smallest angle vertex.

4. The fingerprint identification method based on the fuzzy feature point information of claim 2, wherein the step e of calculating the rotation angle and the translation distance of the scene fingerprint relative to the fingerprint template based on the fuzzy feature point information, and rotating and/or translating the scene fingerprint according to the calculation result, comprises: with the largest angle vertex of the scene fingerprint as a fiducial point, respectively calculating the rotation angle and the translation distance of the non-isosceles triangle matched with the first threshold pair, and using the calculated numerical values with the highest frequency as a rotation coefficient and a translation coefficient of the scene fingerprint for rotating and translating the scene fingerprint.

5. The fingerprint identification method based on the fuzzy feature point information of claim 2, wherein matching success in the step c comprises the following conditions:
the attributes of three pairs of vertexes corresponding to the scene fingerprint and the fingerprint template based on the fuzzy feature point information are consistent;
the length differences of three pairs of sides corresponding to the scene fingerprint and the fingerprint template based on the fuzzy feature point information are within a second threshold; and the angle differences of three pairs of angles corresponding to the scene fingerprint and the fingerprint template based on the fuzzy feature point information are within a third threshold.

6. The fingerprint identification method based on the fuzzy feature point information of claim 5, further comprising the following step between the step S2 and the step S4:

S3, calculating the number of the horizontal coordinate, the vertical coordinate and the attribute of the rotated and translated scene fingerprint matched with the feature points of the registration information of the fingerprint template based on the fuzzy feature point information, if the calculation result is not larger than a fourth threshold, the scene fingerprint is not matched with the fingerprint template based on the fuzzy feature point information, and if the calculation result is larger than a fourth threshold, executing the step S4.

7. The fingerprint identification method based on the fuzzy feature point information of claim 1, wherein $C_0$-$C_n$ comprise a first portion and a second portion, the value of the first portion is randomly generated, and the value of the second portion is a value obtained by calculating the value of the first portion according to the preset rule.

8. The fingerprint identification method based on the fuzzy feature point information of claim 7, wherein the step S4 of substituting the feature point information of the scene fingerprint into the polynomial, calculating the values of $C_0$-$C_n$ and judging whether the calculated $C_0$-$C_n$ meet the preset rule, comprises:

substituting the feature point information of the scene fingerprint into the polynomial, calculating the values of $C_0$-$C_n$, obtaining the value of the first portion in $C_0$-$C_n$, calculating the value of the first portion according to the preset rule to obtain the value of the second portion, and judging whether the calculated value of the second portion is the same as the value of the second portion in the template fingerprint.

* * * * *